(12) United States Patent
Wong et al.

(10) Patent No.: US 11,036,011 B2
(45) Date of Patent: Jun. 15, 2021

(54) FIBER OPTIC CONNECTOR WITH MULTI-PURPOSE RELEASE ASSEMBLY CONFIGURED FOR POLARITY CHANGE

(71) Applicant: Senko Advanced Components, Inc., Marlborough, MA (US)

(72) Inventors: Yim Wong, Kowloon (HK); Kazuyoshi Takano, Tokyo (JP); Guanpeng Hu, Shanghai (CN); Man Kit Wong, Kowloon (HK)

(73) Assignee: Senko Advanced Components, Inc., Marlborough (MA)

( * ) Notice: Subject to any disclaimer, the term of this patent is extended or adjusted under 35 U.S.C. 154(b) by 0 days.

(21) Appl. No.: 16/856,829

(22) Filed: Apr. 23, 2020

(65) Prior Publication Data

US 2021/0141167 A1     May 13, 2021

Related U.S. Application Data

(60) Provisional application No. 62/837,367, filed on Apr. 23, 2019.

(51) Int. Cl.
*G02B 6/38* (2006.01)
(52) U.S. Cl.
CPC ......... *G02B 6/3893* (2013.01); *G02B 6/3825* (2013.01)

(58) Field of Classification Search
None
See application file for complete search history.

(56) References Cited

U.S. PATENT DOCUMENTS

| | | | |
|---|---|---|---|
| 2015/0177463 A1* | 6/2015 | Lee | G02B 6/387 385/76 |
| 2015/0219857 A1 | 8/2015 | Lichoulas et al. | |
| 2016/0018606 A1 | 1/2016 | Xue et al. | |
| 2016/0327756 A1 | 11/2016 | Raven et al. | |
| 2016/0370545 A1* | 12/2016 | Jiang | G02B 6/3893 |
| 2017/0153397 A1 | 6/2017 | de Jong et al. | |
| 2017/0205590 A1* | 7/2017 | Bailey | G02B 6/3885 |
| 2017/0205591 A1* | 7/2017 | Takano | G02B 6/3885 |
| 2018/0335577 A1 | 11/2018 | Wong et al. | |
| 2018/0341069 A1 | 11/2018 | Takano et al. | |
| 2019/0018201 A1 | 1/2019 | Takano et al. | |

OTHER PUBLICATIONS

International Search Report and Written Opinion, Application No. PCT/US20/29585, dated Aug. 10, 2020, pp. 7.

* cited by examiner

*Primary Examiner* — Jerry Rahll

(57) ABSTRACT

Embodiments disclosed herein are directed to a fiber optic connector with that can be released from a receptacle port such as an adapter or a transceiver. The release assembly is a push/pull tab, a cable boot release and a latch controller called the release types. The fiber optic connector is field installable, and is configured to change polarity when configured with the release types.

20 Claims, 15 Drawing Sheets

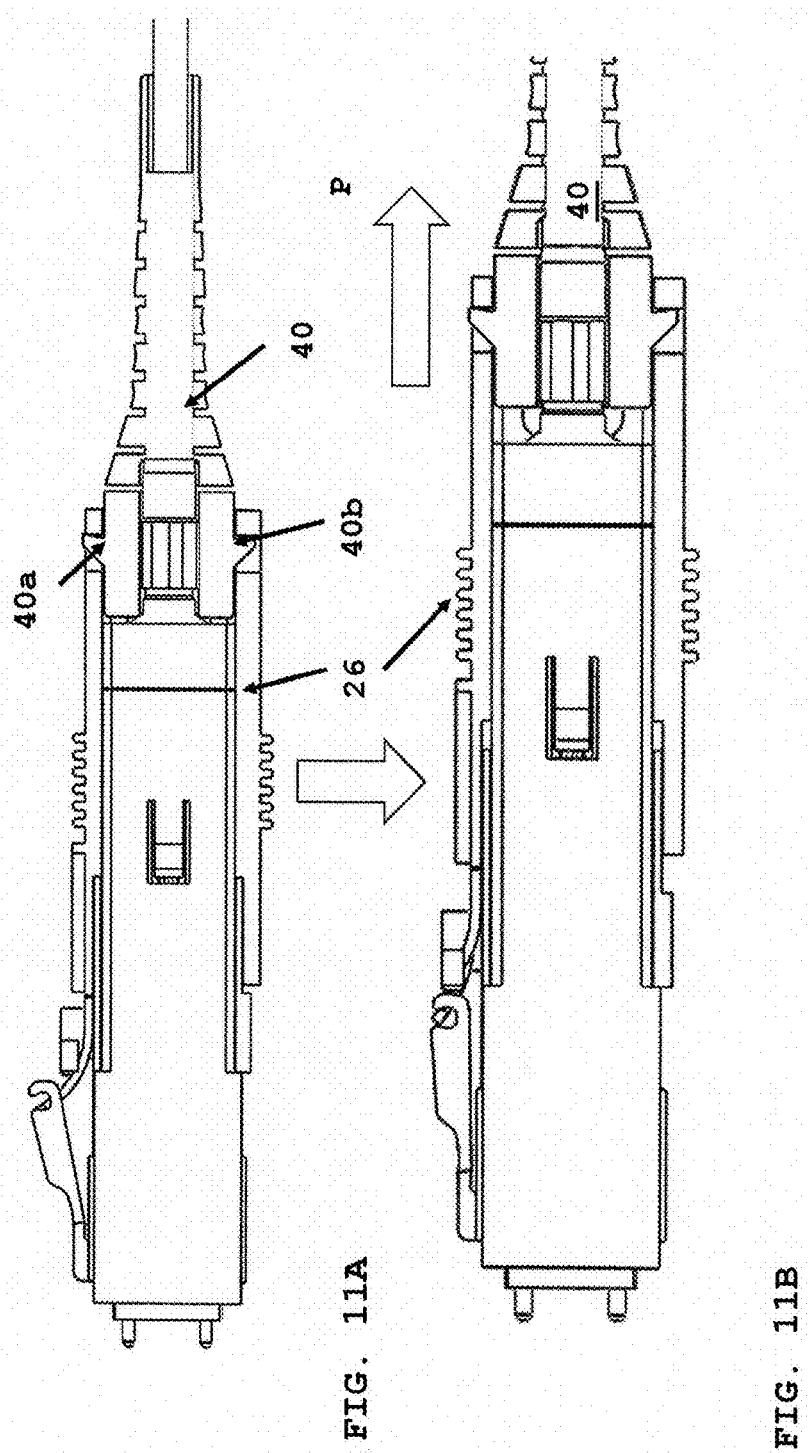

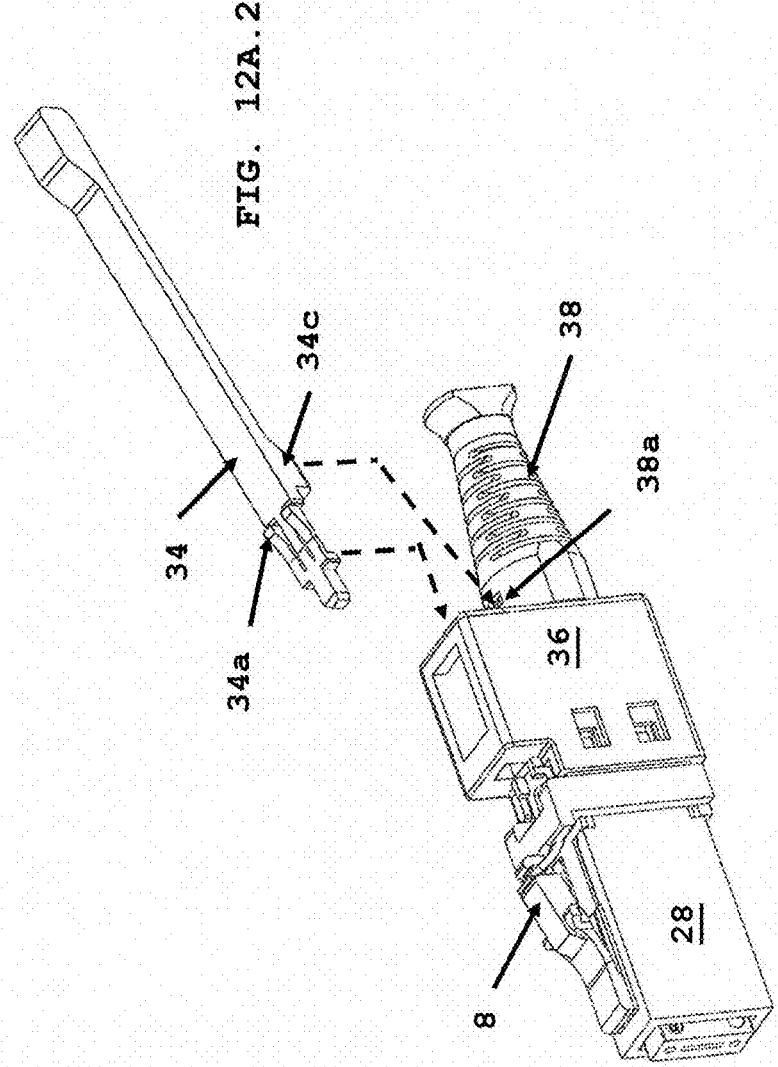

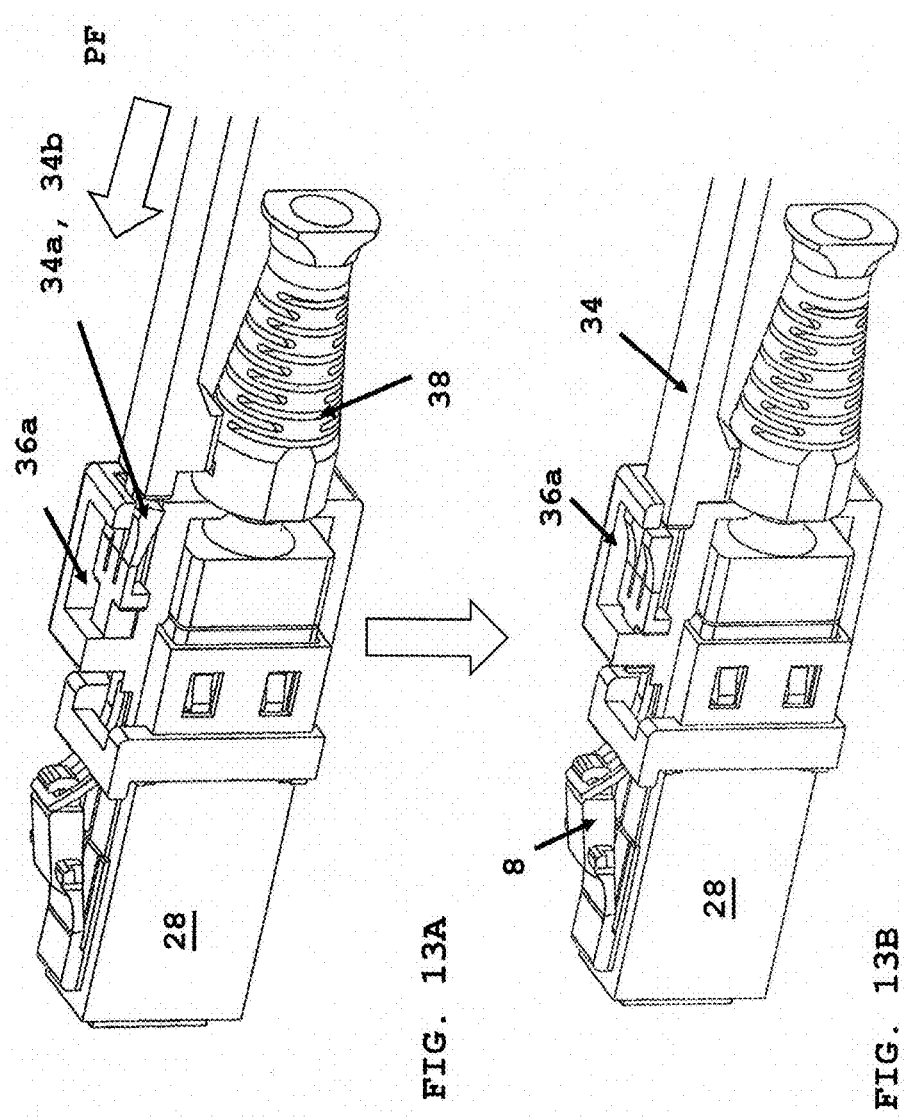

though the operator has a clear line of sight, guiding the tool to the release mechanism may be a time-consuming process. Thus, using a tool may not be effective at reducing support time and increasing the quality of service.

Providing a multiple release type connector with polarity change allows for increased fiber optic density and reduced time to install or maintain. Accordingly, there is a need for fiber optic connectors that will meet the needs of future developments in crowded data center racks.

FIBER OPTIC CONNECTOR WITH MULTI-PURPOSE RELEASE ASSEMBLY CONFIGURED FOR POLARITY CHANGE

CROSS-REFERENCE TO RELATED-APPLICATIONS

This application claims the benefit of priority of U.S. Provisional Application No. 62/837,367 filed on Apr. 23, 2019, which is incorporated herein by reference in its entirety.

BACKGROUND

The present disclosure relates generally to connectors having a remote release, a housing release, a cable boot release or a combination of the release types, and the release types are removable to allow for polarity change of the connector. The connector housing may contain a LC-optical type ferrule with a single optical fiber within the ferrule, or a mechanical transfer The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, the deployment of high-density interconnect panels has not been fully realized. By providing different release types as part of the same fiber optic connector assembly, a user can reduce on-hand inventory, decrease installation and maintenance time, as the network configuration becomes more complicated.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to individual release mechanisms. Such physical obstructions may impede the ability of an operator to minimize the stresses applied to the cables and the connectors. For example, these stresses may be applied when a user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the

SUMMARY

In summary, one embodiment of the present connector with polarity change, deploys a connector housing configured to releasable accept a release assembly formed of an adapter latch or actuator subassembly and a push/pull tab sub-assembly. The connector housing has a pair of opposing longitudinal receivers on the first sidewall and the second sidewall of the connector housing, the longitudinal receivers accept a pair of opposing latch arms extending generally perpendicular from the longitudinal axis of the push/pull tab subassembly, and the latch arms are nearer a proximal end of the push/pull tab subassembly. Opposite the latch arms is an opening with opposing cut-outs formed as part of opposing sidewalls, the opening is configured to accept a corresponding second cut-out formed as part of an actuator arm at the distal end thereof. The push/pull tab cut-out and the actuator arm cut-out when connected mate the push/pull tab subassembly and the actuator subassembly to form the release assembly. The actuator subassembly has a plural of hook arms with hooks generally perpendicular to the longitudinal axis of the actuator that when secured to the proximal end of the connector housing, the hooks engaged a corresponding undercut in the connector housing thereby releasably securing the actuator arm to the connector housing.

The connector is complete when the mechanical transfer ferrule accepts a pin-keeper, with or without a slit along one side of the pin-keeper, the pin-keeper is biased by a spring with a slit or opening along the longitudinal side of the bias spring, the bias spring is put under a pre-determined load when a backbody with opposing latches are secured within a backbody receiver nearer a distal end of the connector housing. The assembled connector polarity is reconfigured from a first polarity to a second polarity when the release assembly is removed from a first side or top side of the connector housing and reattached to a second side or bottom side of the connector housing.

A further aspect provides for mix and match of connector types within an adapter or transceiver allowing a MPG connector and LC connector to communicate, and a MPO connector with a first or second release mechanism or a first or second boot to be interconnected, or interconnected with a LC type connector with the first or second release mechanism or the first or second boot. The interconnecting of connector types included, but are not limited, to LC connector with the first release mechanism and the second boot interconnected with a LC connector with the second release mechanism and the second boot. Another non-limiting interconnection schema is a MPO connector with a second release mechanism and the first boot interconnected with a LC connector with the second release mechanism and the second boot.

BRIEF DESCRIPTION OF THE DRAWINGS

FIG. 11A depicts a cable boot secured to a distal end of the latch controller;

FIG. 11B depicts pulling rearward the cable boot;

FIG. 12A.1 depicts an interconvertible fiber optic connector according to another embodiment of the present invention;

FIG. 12A.2 depicts a push/pull arm;

FIG. 13A depicts attaching the push/pull arm to the connector of FIG. 12A.1;

FIG. 13B depicts the push/pull arm attached to the assembled connector of FIG. 12A.1 and FIG. 12A.2.

Corresponding reference numbers indicate corresponding parts throughout the drawings.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or component thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC), an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a remote release mechanism such that a user can remove cable assembly connectors that are closely spaced together on a high-density panel without damaging surrounding connectors, accidentally disconnecting surrounding connectors, disrupting transmissions through surrounding connectors, and/or the like. Various embodiments also provide narrow pitch LC duplex connectors and narrow width multi-fiber connectors, for use; for example, with future narrow pitch LC SFPs and future narrow width SFPs. The remote release mechanisms allow use of the narrow pitch LC duplex connectors and narrow width multi-fiber connectors in dense arrays of narrow pitch LC SFPs and narrow width multi-fiber SFPs.

Figure 1:
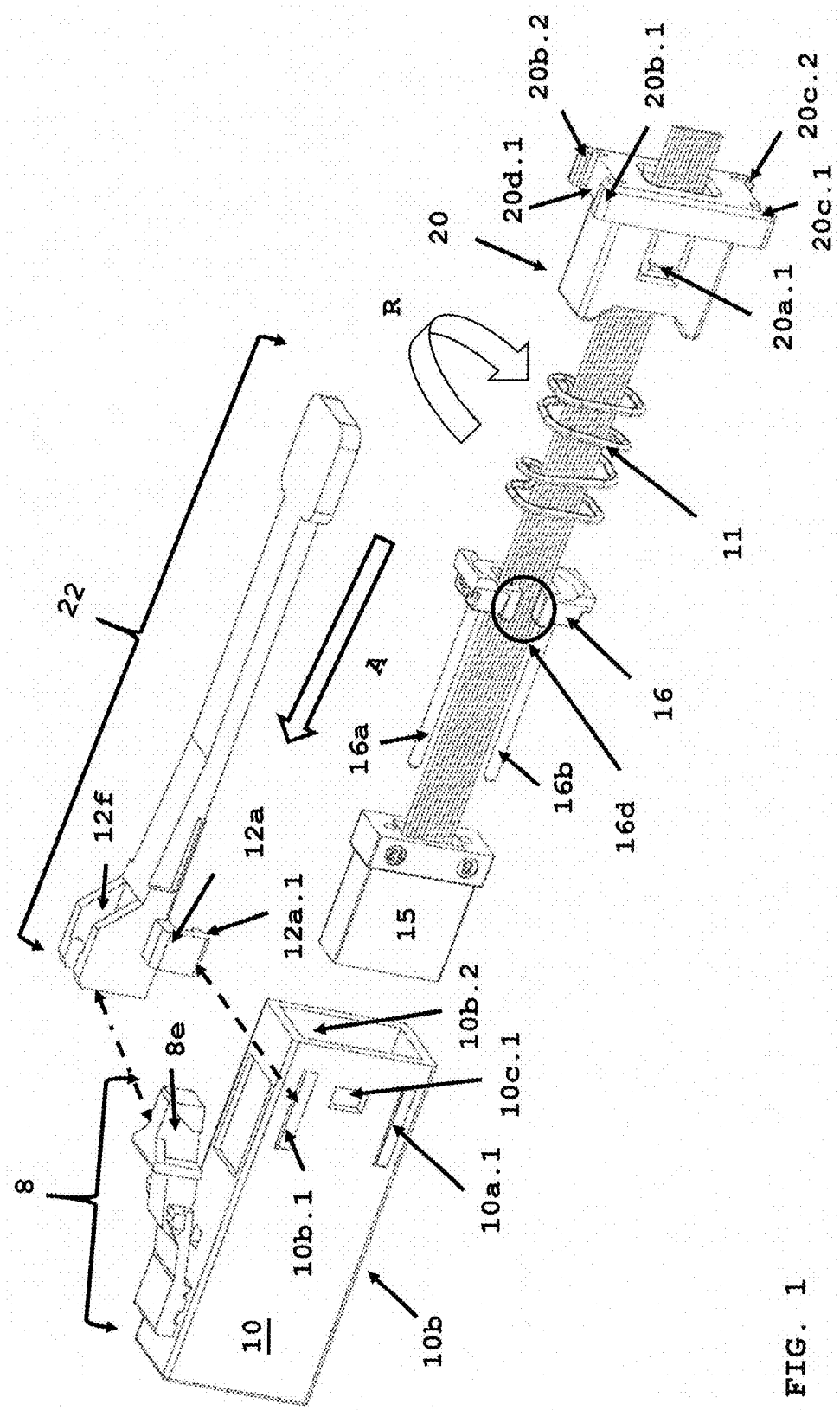
FIG. 1 is an exploded view of a fiber optic connector with a removable, release assembly.
Figure 2:
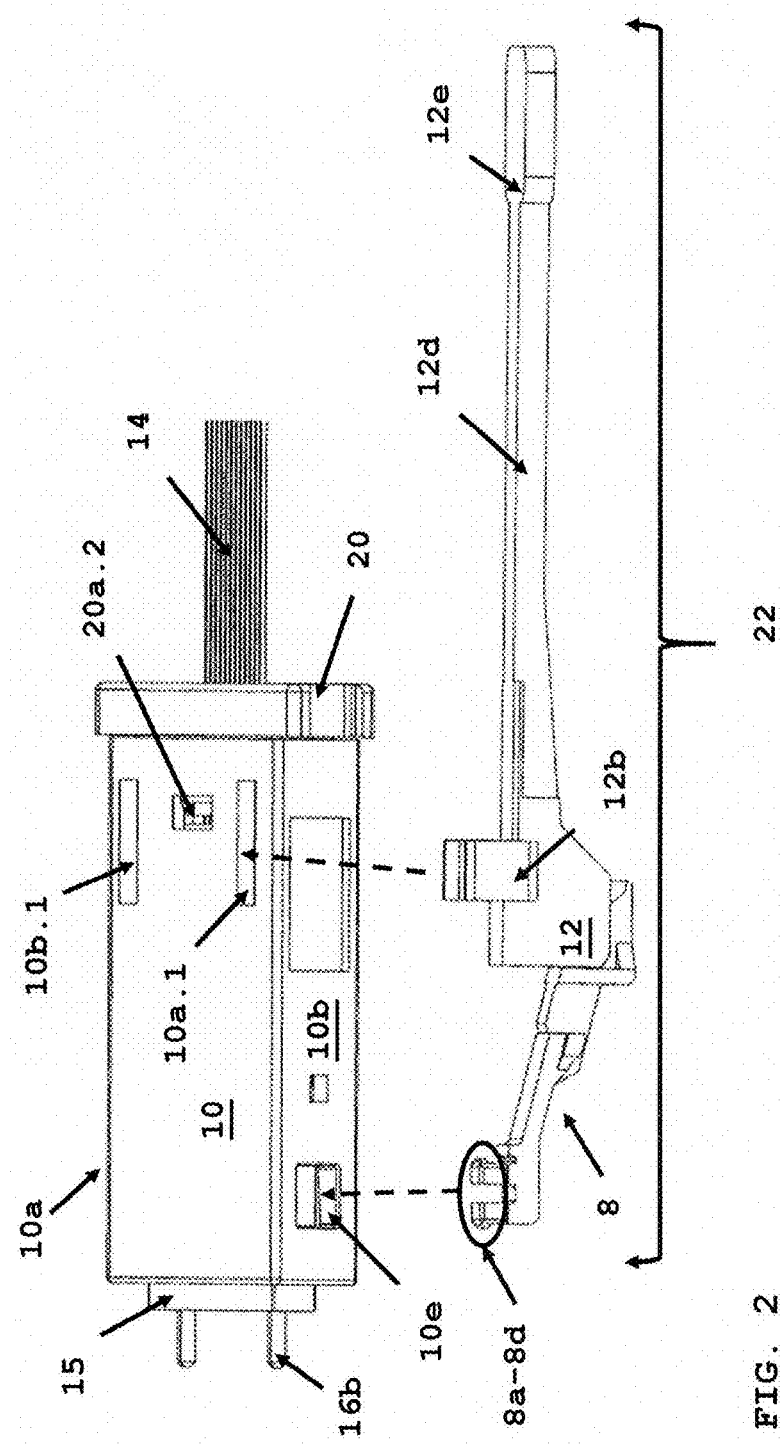
FIG. 2 is an exploded view of the connector of FIG. 1 reconfigured to a second polarity.

FIG. 1 depicts an exploded view of a fiber optic connector configured for polarity change with a releasably attached release assembly (22). The release assembly as depicted is attached to a top side (10c) of a connector housing (10) to configure the connector in a first polarity (P1). FIG. 2 depicts the connector of FIG. 1, the connector is assembled with the release assembly (22) just prior to securing to a bottom side (10d) of the connector housing (10) to reconfigure the connector into a second polarity (P2), different from a first polarity.

A polarity change for a LC-type optical fiber connector is disclosed in U.S. Pat. No. 10,192,230B2 to WONG and assigned to the assignee of the present invention. The WONG patent is fully incorporated by reference into the present application. Referring to FIG. 1, the connector is assembled when the release assembly (22) is releasably secured to the connector housing (10). The adapter latch arm (8) has a plural of hooks (8a-8d) that are accepted in a hook receiver (10e). The hook receiver may be an opening in the connector housing, and when the hooks are inserted into the opening, the hook arms are slightly compressed and when the hooks are beyond the wall of the connector housing, the hooks expand under the wall thereby securing the actuator arm to the connector. The user can use a tool to compress the plural of hooks (refer to FIG. 2) to remove the release assembly from the connector housing during polarity change.

Figure 14:
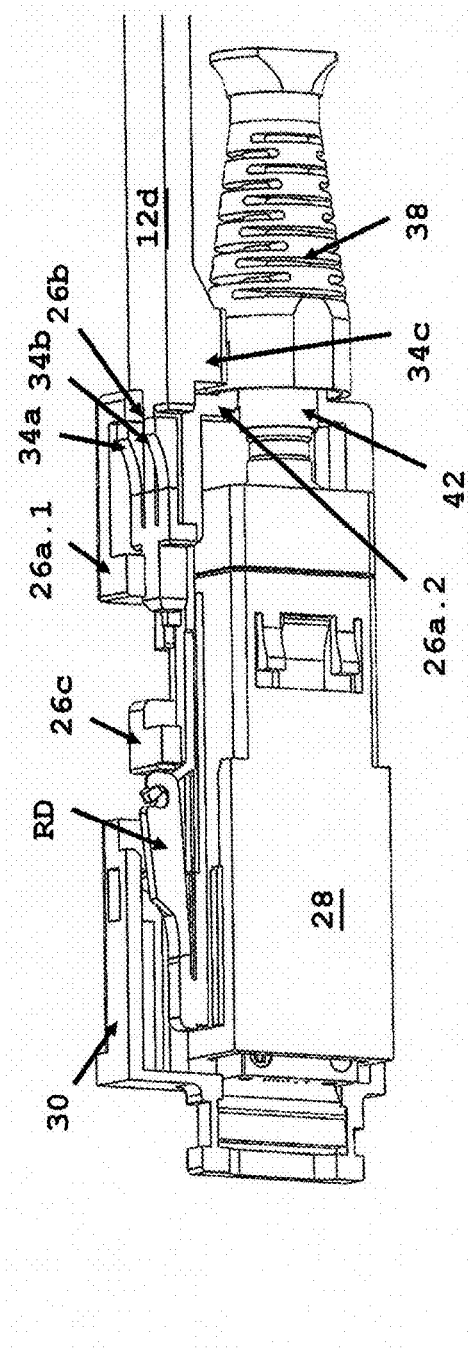
FIG. 14 depicts a cross-view of the interconvertible connector within an adapter port.

Still referring to FIG. 1, the push/pull subassembly (12) attaches to a distal end of the adapter latch arm (8) within an opening formed from two opposing sidewalls of the push/pull subassembly (12), the opposing sidewalls each have a cut-out (12f) formed therein and the cut-out (12f) pair accepts a second cut-out (Se) formed at a distal end of the adapter latch arm (8) At a proximal end of the push/pull subassembly (12) is a pair of opposing latch arms (12a, 12b (opposite of 12a)) perpendicular to the longitudinal axis of the push/pull subassembly (12). Each latch arm further comprise a hook (12a.1, 12b.1) that is accepted into the longitudinal receiver (10a.1, 10b.1) in a first polarity position, and when the push/pull subassembly is positioned on the second side (10b), the latch arms are accepted in a second set of longitudinal receivers (10a.2, 10b.2) opposite (10a.1, 10b.1) and the connector is in a second polarity when release assembly (22) is secured to a second side, opposite the side in the first polarity configuration (P1), of the connector housing (10). The longitudinal receiver (10a.1) is on a first side of the connector housing and the longitudinal receiver (10a.2) is opposite receiver (10a.1) on the second side and not shown, and the pair of receivers (10a.1, 10a.2) accept the release assembly (22) and allowing to be displaced longitudinally along the optical axis of the fiber optic connector. Referring to FIG. 2, the push/pull subassembly (12) further comprises a shaft (12d) with a handle (12e) formed nearer a distal end, the user can grab the shaft or handle to pull the release assembly (22) in a rearward or distal direction, to release the connector from an adapter port. FIG. 14 depicts another embodiment of the fiber optic connector with a push/pull subassembly releasing the fiber optic connector from the adapter port.

Referring to FIG. 1 a backpost (20) has a recess at a proximal end and a flange with opposing rails (20d.1, 20d.2), the rail is formed from opposing radial ribs (20b.1, 20b.2) for the first rail (20d.1), and opposing radial ribs (20c.1, 20c.2) for the second rail (20d.2). As shown in FIG. 2, the rails accept and support the shaft (12d) nearer a proximal end of the release arm (22) connector when the user displaces the push/pull tab rearward or forward or along the longitudinal optical axis of the fiber optic connector. The backpost (20) further comprises a pair of opposing latches (20a.1, 20a.2) proximal of the flange of the backpost, the latches secure the backpost into the connector housing within a corresponding backpost latch receiver (10c.1, 10c.2), and when secured the backpost provides a predetermined amount of bias force to the spring (11) to ensure the mechanical transfer ferrule (15) and pin keeper (16) are retained within the connector housing (10). The ferrule (15) may be replaced with a LC-type optical ferrule without departing from the scope of the invention. The assembly of the backpost (20), bias spring (11), pin keeper (16) with opposing pins (16a, 16b), a slit (16d) or longitudinal opening and mechanical transfer ferrule (15) is similar for the fiber optic connector embodiment disclosed below, and to the extent the assembly of these components will differ, this difference will be described as needed. The connector is typically assembled in the direction of arrow (A). For example, as disclosed in FIG. 4, and installed as depicted in FIG. 1, bias spring (11) is placed over the ribbon cable when the ribbon cable is inserted through a slit and then rotated about the ribbon cable in the direction of arrow (R).

Figure 3:
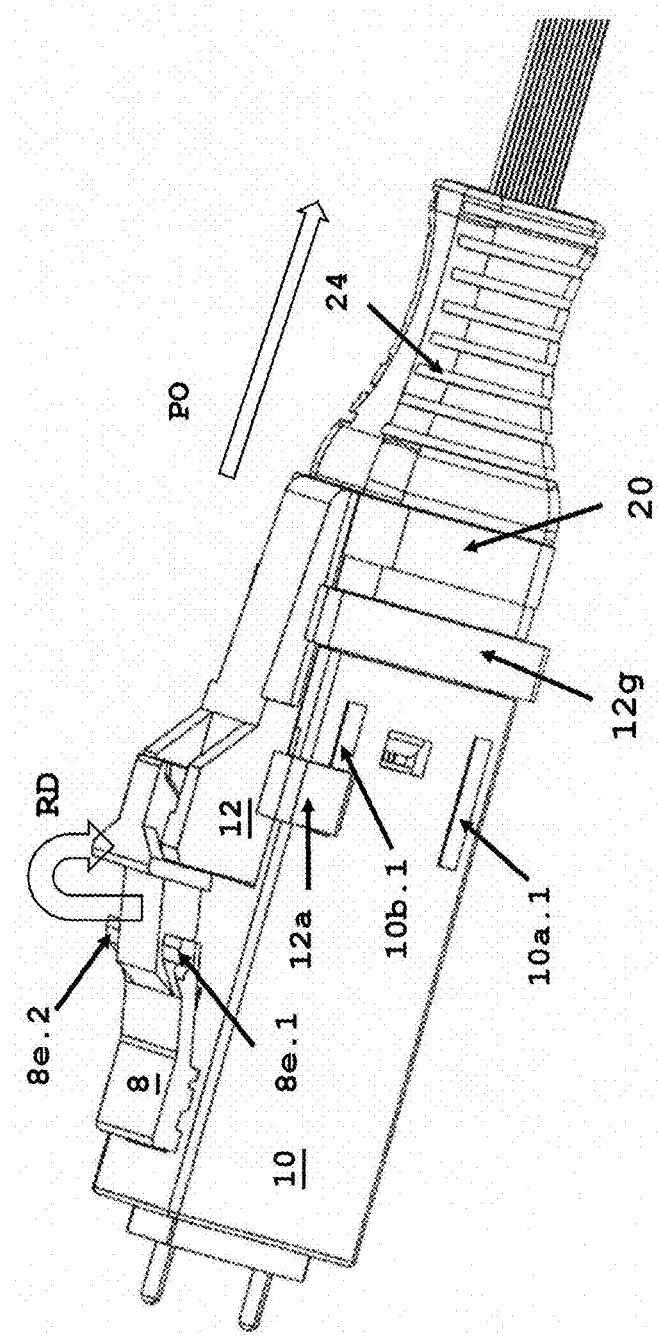
FIG. 3 is a perspective view of the connector of FIG. 1 deploying a push/pull cable boot assembly.

FIG. 3 depicts the connector of FIG. 1 deploying a push/pull boot (24) in the direction of arrow (PO). Push/pull subassembly (12) shaft and handle is replaced with a push/pull cable boot (24). The cable boot is secured to the push/pull assembly through the backpost (20) and to push/pull subassembly (12) with a retainer (12g) positioned about the backpost (20). In operation, when a user pulls the cable boot (24) in a distal or rearward direction, the latch arm rotates down (RD) the adapter latches (8e.1, 8e.2) formed as part of the adapter latch arm (8), which releases the connector from the port of a receptacle, such as an adapter port. Protrusions or adapter latches (8e.1, 8e.2) are formed nearer a proximal end of the adapter latch arm (8) and secure the connector within an adapter port when the protrusion is secured within an opening or cutout formed in the adapter outer housing (refer to FIG. 9C). FIG. 14 depicts a similar securing operation. FIG. 3 depicts the connector in the first polarity position (P1), and as described above in FIG. 1 and FIG. 2, the release assembly operatively connected to the cable boot, using retainer (12g) about backpost (20), can be removed and secured to the second side of the connector housing configuring the connector in the second polarity (P2).

Figure 4:
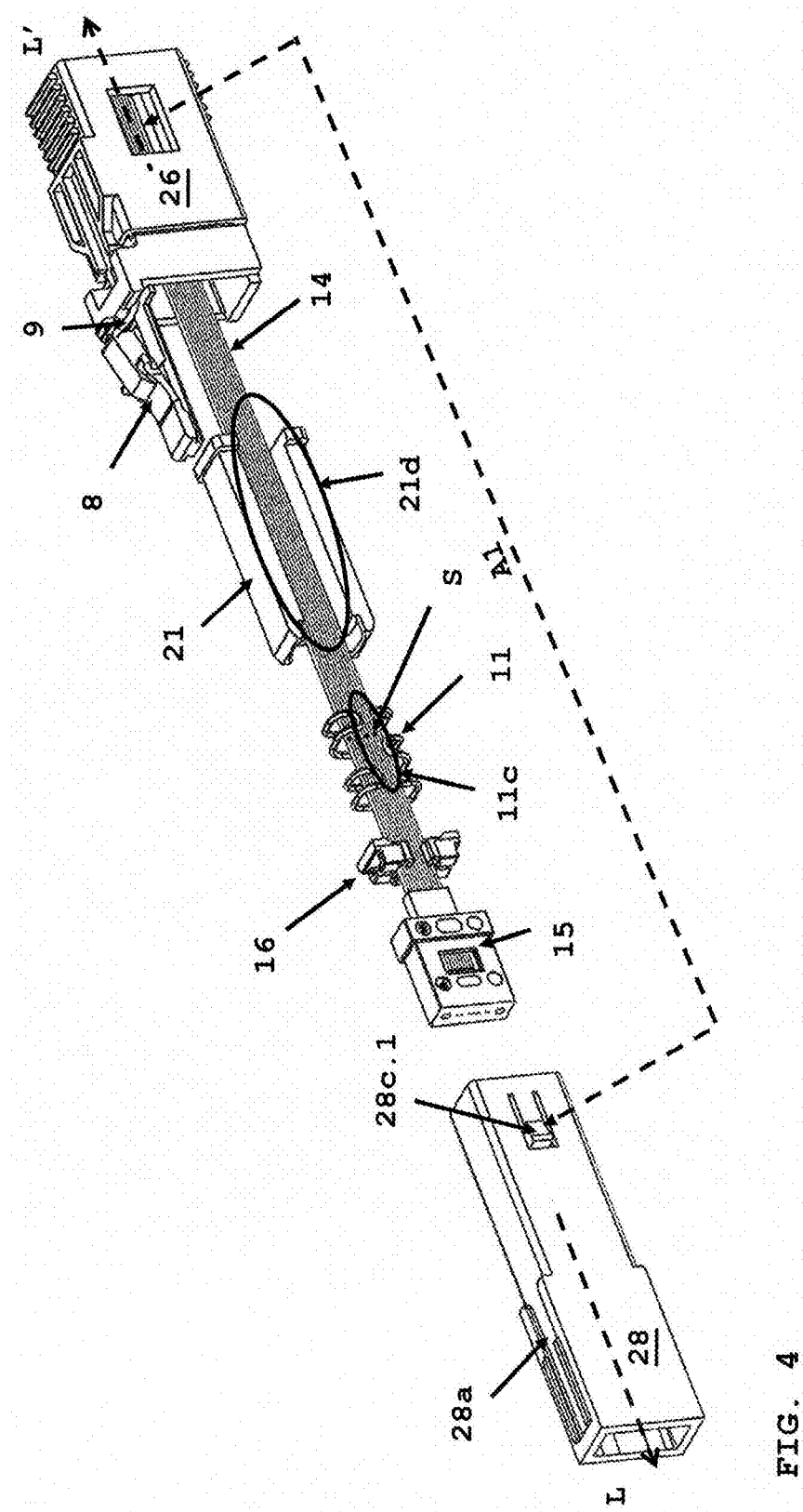
FIG. 4 is an exploded view of another embodiment of a push/pull fiber optic connector configured for polarity change.

FIG. 4 depicts an exploded view of a second embodiment of a fiber optic connector configured for push/pull release from an adapter and polarity change. The connector comprises a connector housing (28) with an adapter latch receiver (28a, 28b) on opposing sides of the connector housing along the longitudinal (L-L') direction of the housing (28). Perpendicular to the latch receiver are opposing latch controller latches (28c.1, 28c.2) that secures the push/pull combined latch controller assembly (26) (refer to FIG. 5A and FIG. 5B), to a distal end of the housing (28), FIG. 4 depicts a field installable fiber optic connector. Ferrule (15) is first terminated with ribbon fiber optic cable by splicing (S). A short length of fiber optic ribbon cable is provided at a distal end of the ferrule (15). This is spliced to the incoming ribbon cable optic fiber (14), using mechanical, chemical or fusion splicing. A pin-keep (16) with a slit or longitudinal opening (16d) configured to accept the ribbon cable without damaging or twisting cable, where the opening is sized to prevent the cable from becoming unintentionally dislodged from a central bore of the pin-keeper. Next spring (11) is positioned about the ribbon cable, as discussed in FIG. 1 above, when the cable is positioned through the opening (11c) and rotated (R) about the cable. The assembled fiber optic connector further comprise a backbody (21) with a slit (21d) or longitudinal opening that is configured to accept the ribbon cable. The connector further comprises a push/pull latch controller assembly (26) also called a latch controller (26), the latch controller (refer to FIG. 5A, FIG. 5B) is an assembly made up of a tab collar (26a) and an inner housing (26b). The inner housing (of latch controller (26)) is configured with the adapter latch arm (8), like adapter latch arm (8), to releasably secure the connector within an adapter port. The connector is assembled, as depicted in FIG. 6, when the opposing latch controller latches (28c.1, 28c.2) are received within opposing openings (26a.2(a), 26.2(b)) (refer to FIG. 5B) along dashed line (A1) of FIG. 4.

Figure 5:
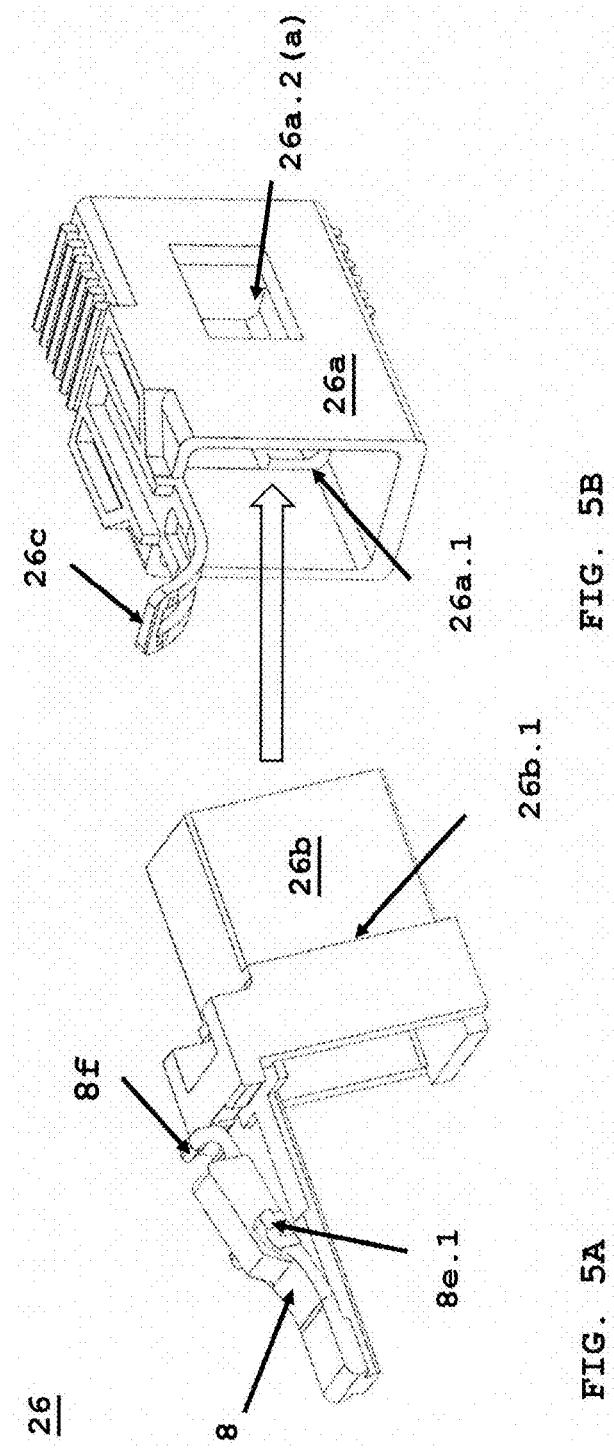
FIG. 5A and FIG. 5B depict two components of the combined push/pull latch controller assembly.
Figure 10:
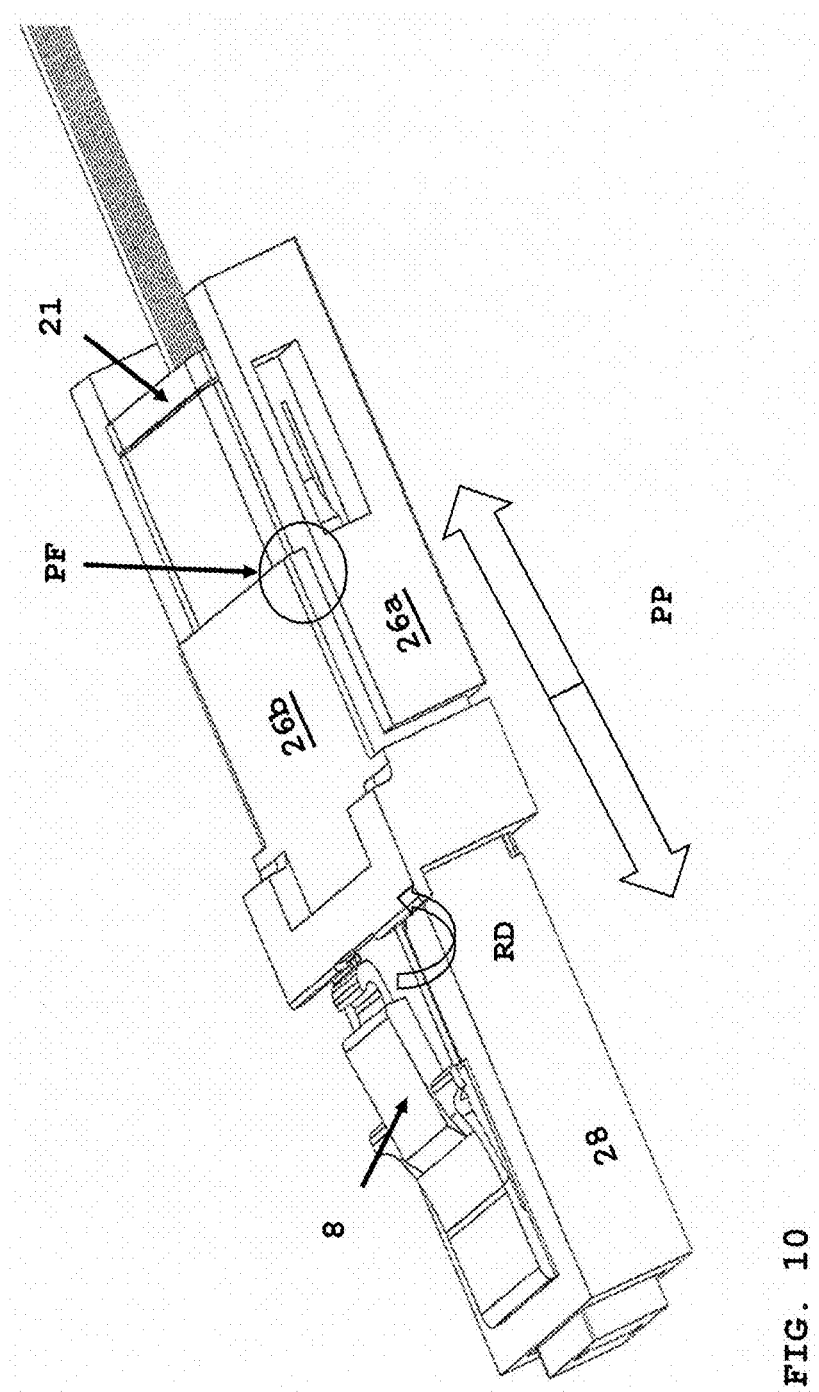
FIG. 10 depicts an alternative embodiment of forming the release assembly according to the present invention.

FIG. 5A and FIG. 5B depicts the push/pull control latch assembly (26). The assembly comprises a tab collar (26a) and an inner housing (26b) that are secured together with locking latch surface (26b.1) and further secured together as described in FIG. 4 along dashed line (A1). Inner housing (26b) is inserted into a proximal end opening until locking latch face (26b.1) engages forward push member (26a.1) within tab collar (26a), as shown in FIG. 5B. Referring to FIG. 5A, the inner housing further comprises a tab hanger (8f) formed as part of the adapter latch arm (8) at a distal end thereof, forming a second embodiment of an adapter latch arm. The locking latch or inner housing (26b) accepts the backbody (21) at a proximal end of the housing (26b) as depicted in FIG. 4, or and the inner housing (26b) is snapped over housing (28) and backbody (21) as depicted in FIG. 10. Referring to FIG. 5A and FIG. 5B, the tab hanger (8f) accepts an actuator arm (26c). In operation when the latch controller (26) is pulled in a distal direction, the actuator arm (26c) rotates down the adapter latch arm (8), in a similar operation as described in FIG. 3.

Figure 6:
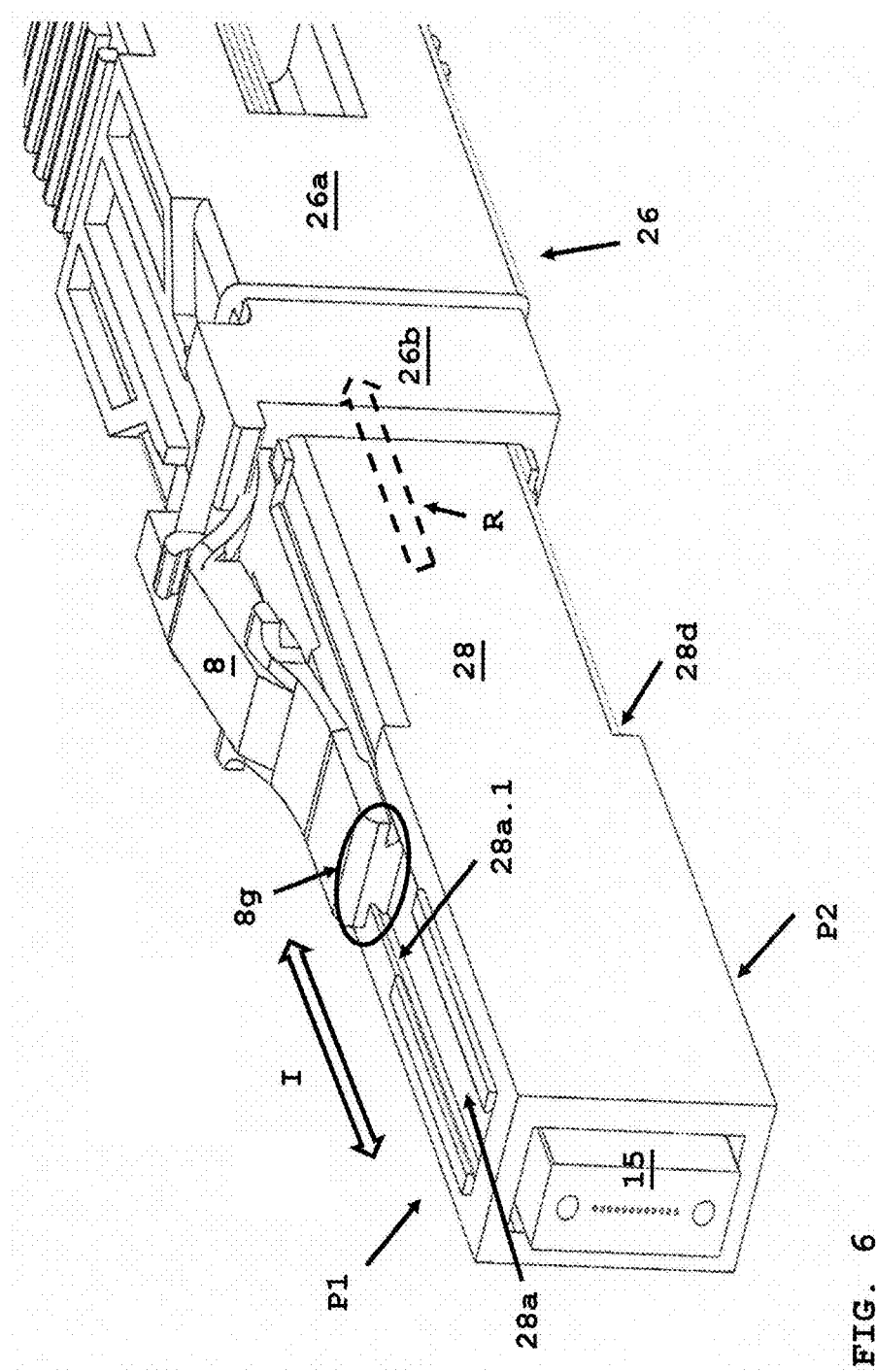
FIG. 6 depicts a perspective view of a polarity changeable fiber optic connector.

FIG. 6 depicts inserting the latch controller (26) being longitudinally secured or removed (in the direction of I)

from the connector housing (28). As latch controller is inserted on a top side (10c) or a bottom side (10d) of the housing (28), a proximal end of the adapter latch arm (8) comprises a dove tail leading edge (8g) that is accept within an adapter latch receiver; 28a) formed by opposing grooves (28a.1, 28a.2) until a proximal end of the inner housing (26b) engages a stop face (28d) formed as part of the connector housing (28). As the latch controller (26) is inserted into the adapter latch receiver (28a), housing (28) is received (R) within latch controller (26). Housing (28) is secured within latch controller as described at FIG. 4 above.

Figure 7:
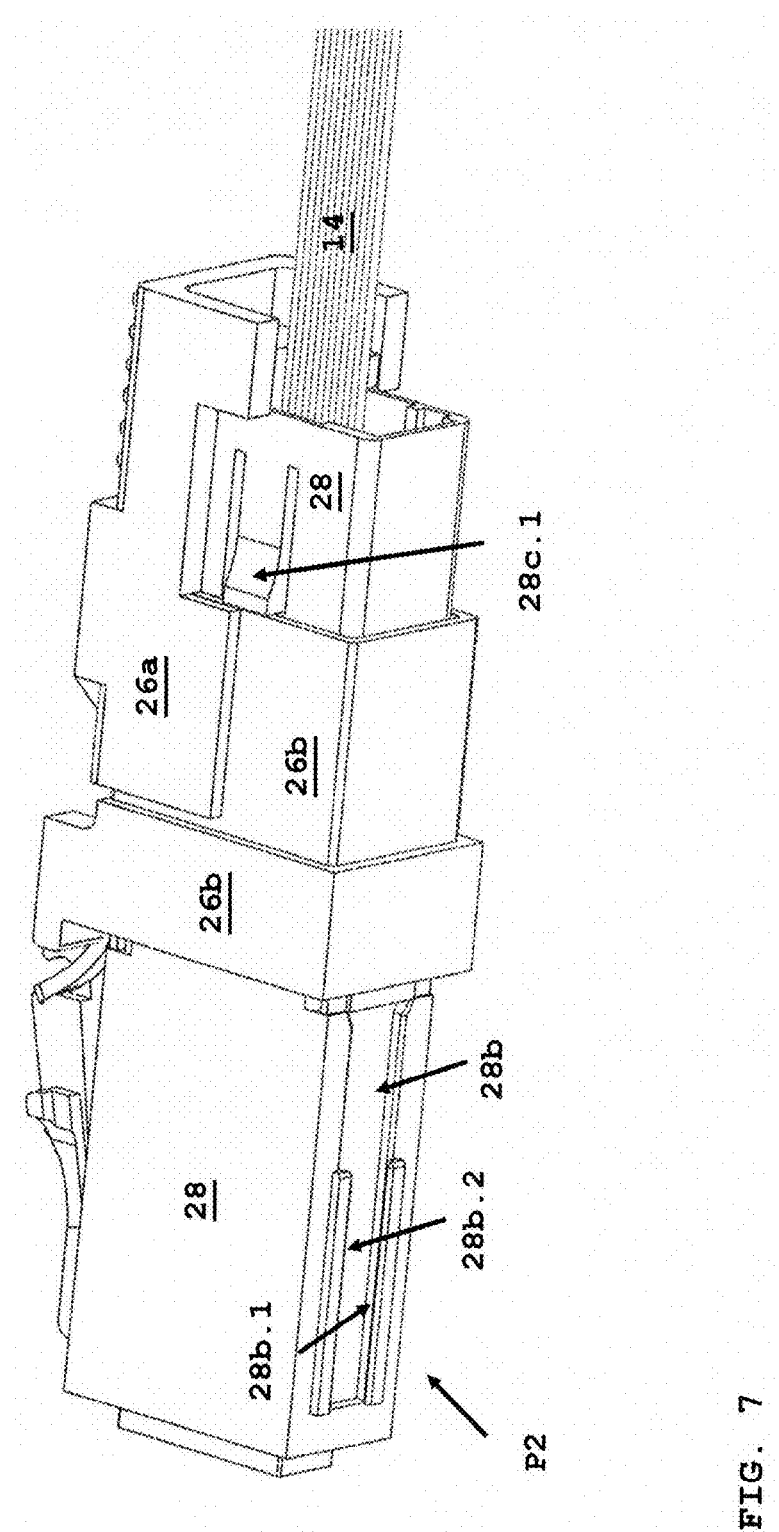
FIG. 7 depicts a bottom view of the fiber optic connector of FIG. 6 assembled.
Figure 8:
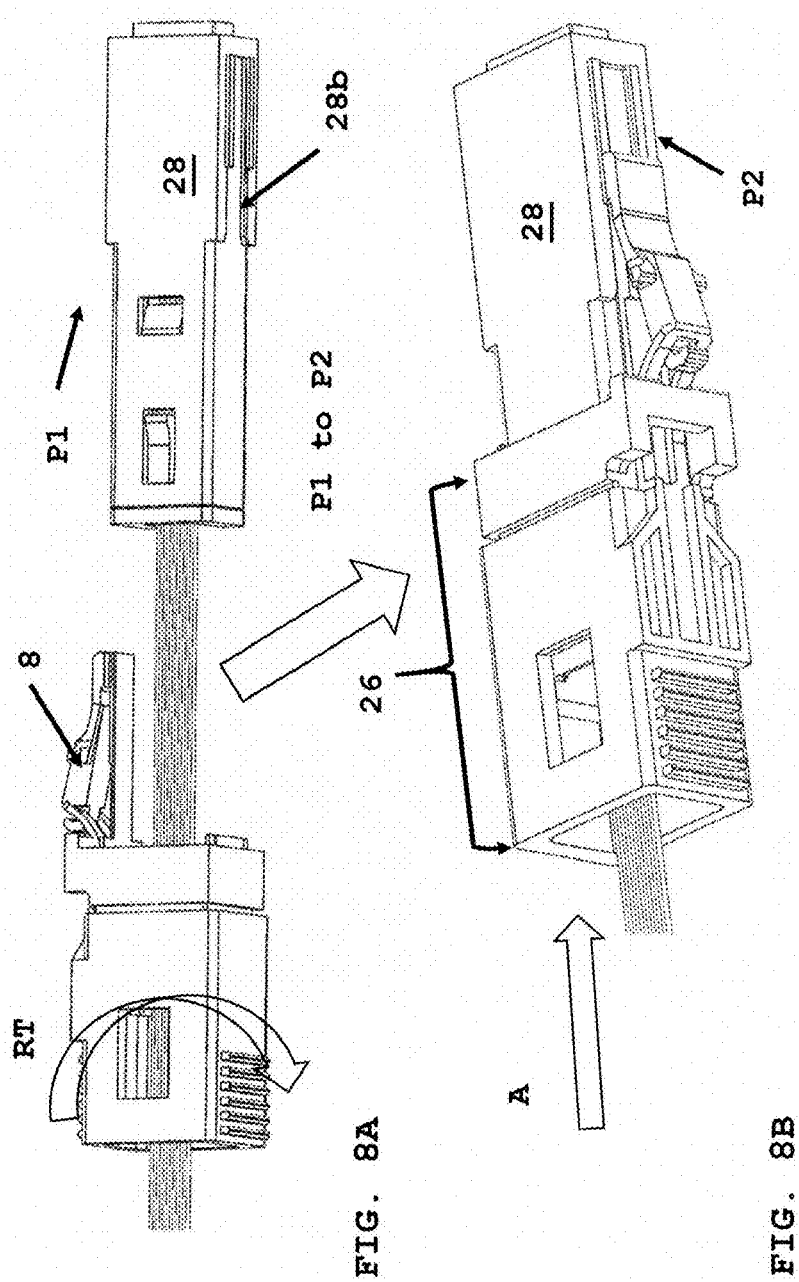
FIG. 8A depicts changing the connector of FIG. 6 from a first polarity.
FIG. 8B depicts converting the connector of FIG. 6 into a second polarity.

FIG. 7 depicts the assembled connector of FIG. 6 at the second side or bottom side (10d) of the connector. Second adapter latch receiver (28b) with opposing grooves (28b.1, 28b.2) is configured to accept the dovetail (8g). which configures the connector in the second polarity (P2). To eject or remove the latch controller (26) from housing (28), the user would depress opposing latch controller latches (28c.1, 28c.2). FIG. 8A and FIG. 8B depicts changing the connector of FIG. 6 from the first polarity (P1) to the second polarity (P2) where the first polarity (P1) is different form the second polarity (P2). In FIG. 8A, the user ejected the latch controller (26) as described in FIG. 7, and pulled the latch controller in a direction away from the housing (28) along the ribbon optical fiber (14), and rotated (RT) the housing (28) about the ribbon cable until the adapter latch arm (8) is positioned to be accepted in latch receiver (28b), thereby to configure the connector in a second polarity (P2) as depicted in FIG. 8B, when the latch controller is inserted onto the housing (28) in direction of arrow (A), as described in FIG. 7.

Figure 9:
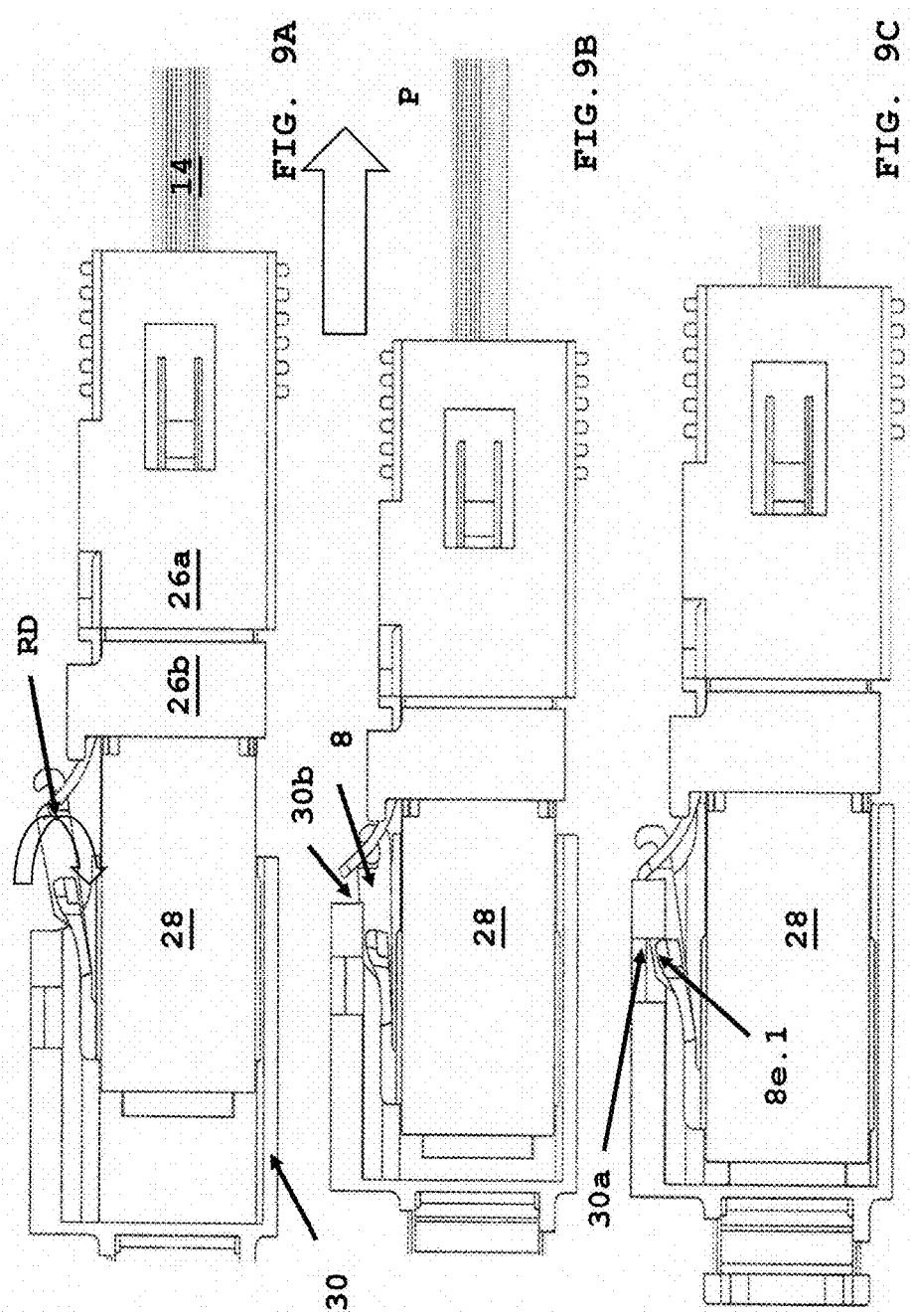
FIG. 9A depicts inserting of the connector of FIG. 6 into an adapter port.
FIG. 9B depicts a partial insertion of the connector of FIG. 6 into the adapter port.
FIG. 9C depicts the connector of FIG. 6 inserted into the adapter port.

FIG. 9A to FIG. 9C depicts inserting the connector of FIG. 6 or FIG. 4 (assembled) into an adapter (30) port. In FIG. 9A. The adapter latch arm (8) is depressed or rotated down (RD) when a portion of the arm (8) strikes a leading edge (30b) of the adapter housing. As the user continues to push the connector into the adapter (30), the latch arm (8) is depressed (refer to FIG. 9B) until the latch arm (8) is seated with the adapter port, at which point the latch arm (8) returns to its original position and is partially received in adapter opening (30a), and the protrusions or adapter latches (8e.1, 8e.2) are secured at an edge of the opening (30a) in the wall of the adapter as shown in FIG. 9C. To remove the connector, the user would pull rearward on the latch controller (26) or the cable boot (refer to FIG. 11B), in the direction of arrow (P), which rotates down the latch arm (8), and this positions the protrusions or adapter latches (8e.1, 8e.2) beneath the edge (30a), so the user can pull the connector out of the adapter port.

FIG. 10 depicts another embodiment of the connector with the locking latch (26b) (reconfigured inner housing) snaps over the tab collar (26a) as shown at PF. As the tab collar (26) is moved forward, the locking latch (26b) is pressed against the distal end of the housing (28) and rotates down (RD) the latch arm (8) when the actuator arm (26c) pushes down on tab hanger (8f), as the latch controller (26), cable boot (24, 38) or push/pull tab assembly (24, 38) is pulled in rearward or distal direction. The tab controller may be pushed forward or pulled rearward in direction of arrow (PP).

FIG. 11A and FIG. 11B replaces the push/pull tab (12) with a push/pull cable boot (40) that is configured to displace the latch controller (26) to release the connector from an adapter port as described above. The cable boot (40) has a pair of opposing wings (40a, 40b) secured with openings at a distal end of the connector housing. The latch controller (26) is secured to the housing as described above, so when the cable boot is pulled rearward in direction of arrow (P), the actuator arm (26c) depresses or rotates down the latch arm (8) releasing the connector from the adapter port. The cable boot moves freely back and forth on the crimp ring allowing to longitudinally displace the latch controller. This configuration can handle a 2 mm fiber optic cabling. Fully incorporated herein by reference is applicant published application US2020/081201A1 TAKANO titled "LC Type Connector with Push/Pull Assembly for Releasing Connector from a Receptacle Using a Cable Boot".

Figure 12B:
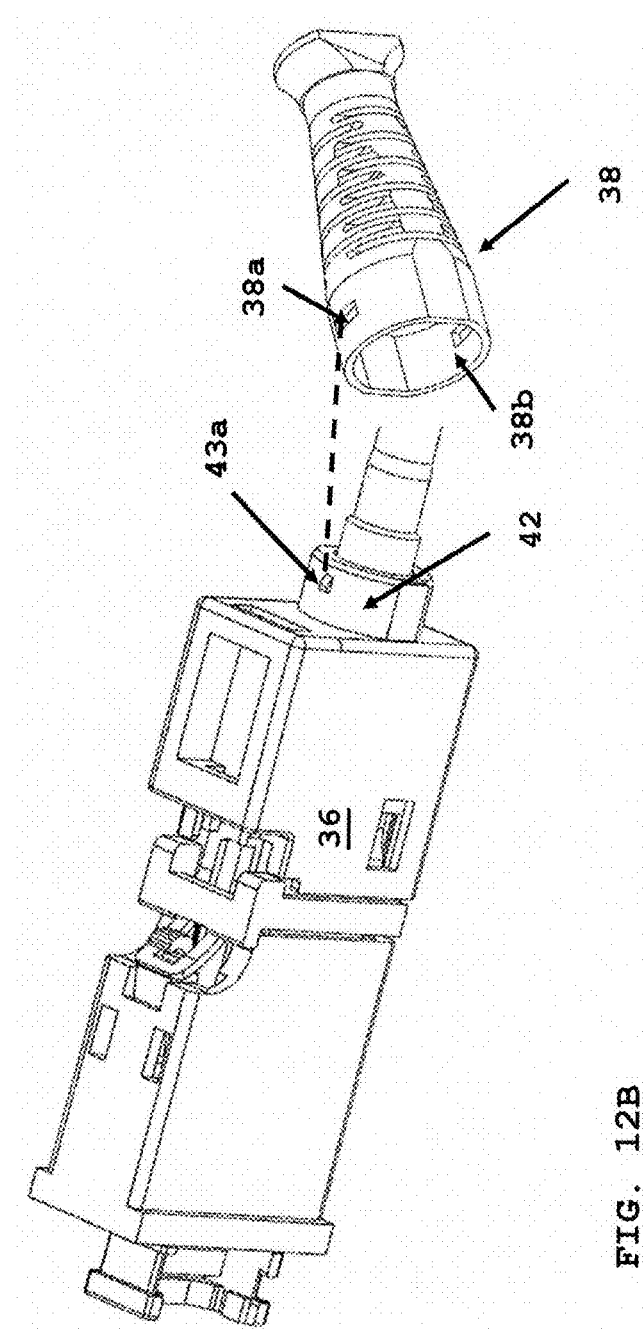
FIG. 12B depicts an exploded view of securing the cable boot to the connector of FIG. 12A.1.

FIGS. 12A.1-14 depicts another embodiment that combines a push/pull arm (34) and a cable boot (38) that are interconvertible, that is, during installation or maintenance the user can deploy the releasably removable push/pull arm (34) or remove the push/pull arm (34) and use the cable boot (38) to remove or inserted the connector, or retain both the push/arm (34) and cable boot (38) at a distal end of the latch controller (36), as shown in FIGS. 12A.1 and 12A.2 or in FIG. 13A, to release the fiber optic connector from within an adapter port (not shown), using the same operation of the latch release arm (8) as described in FIGS. 9A-9C. The push/pull arm (34) has a shaft with a handle at the distal end similar to push/pull (12) above. The push/pull arm is attached to the latch controller (36) as shown by the dashed lines. In FIG. 12B, a cable boot (38) is attached to backpost operatively engaged with the latch controller (36), and the cable boot (38) is attached at a distal end of the backbody when openings (38a, 38b) are secured with a corresponding pair of opposing latch protrusions (43a, 43b) formed as part of the backbody post.

FIG. 13A to FIG. 14 depicts the assembled connector of FIG. 12A.1 and FIG. 12A.2. Referring to FIG. 13A and FIG. 13B, the proximal end of the push/pull arm (34) is secured within the opening (36a). In FIG. 13A user pushes on push/pull arm (34) in direction of arrow PF. The latches (34a, 34b) are depressed as shown, and expand back in opening (36a) as shown in FIG. 13B once the push/pull arm is secured to the moveable latch controller (36). FIG. 13B depicts a partial cross-section of the assembled fiber optic connector, the user pulls the arm (34) rearward and the latch controller (36) will move rearward depressing or rotating down the latch arm (8) as described above. The user can remove the push/pull arm (34) and pull the cable boot (38) rearward and depress the latch arm (8) down releasing the connector from adapter port.

FIG. 14 depicts a cross-section along the top view of the interconvertible connector of FIG. 12A.1 and FIG. 12A.2 assembled when being inserted into an adapter (30). A top frame (26a.1) of opening (36a) of the latch controller (36) has a first frame edge (26d) which engages latches (34a, 34b) when the shaft (12d) is pulled rearward. Also when the cable boot (38) is pull rearward, a frame portion (26a.2) engages underside protrusion (34c) pulling the shaft (12d) rearward releasing the connector from the adapter port with latch release arm (8) as described above. If the push/pull arm (34) is removed from the latch controller (36), and with the backbody (42) operatively connected to the latch controller (36), the cable boot causes the latch arm release (8) to rotate down (RD) releases the connector from the adapter port.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will also be understood by one skilled in the art all language such as "up to," "at least," and the like include the number recited and refer to ranges which can be subsequently broken down into subranges as discussed above

What is claimed is:

1. A fiber optic connector configured with a mechanical transfer ferrule, comprising:
   a housing configured to secure the mechanical transfer ferrule;
   the housing is configured to receive an adapter latch assembly nearer a proximal end of the housing,
   the housing is further configured to receive a push-pull assembly nearer a distal end of the housing;
   the push-pull assembly and adapter latch assembly are mated when opposing first cut-out and second cut-out that interlock to form a release assembly,
   the release assembly is received in a rail;
   the release assembly secured to a top side of the housing configures the connector in a first polarity and when the release assembly is secured to a bottom side of the housing, the connector configured in a second polarity; and wherein
   the first polarity is not the same as the second polarity for the mechanical transfer ferrule.

2. The fiber optic connector configured with a mechanical transfer ferrule of claim 1, wherein a longitudinal receiver limits a travel of the push/pull assembly to ensure the adapter latch assembly is fully rotated down to release the fiber optic connector from an adapter.

3. The fiber optic connector of claim 1, wherein a push/pull cable boot assembly is secured to a distal end of a backbody and secured about the backbody with a retainer, the push/pull cable boot travel is limited to rotate down the adapter latch to release the fiber optic connector from an adapter port.

4. The fiber optic connector configurable in a first polarity or a second polarity according to claim 1, wherein pulling the latch controller in a rearward direction rotates down the latch release arm thereby releasing the fiber optic connector from an adapter port.

5. The fiber optic connector configurable in a first polarity or a second polarity according to claim 1, wherein the latch controller at distal end is configured to accept a cable boot, and further wherein pulling the cable boot in a rearward direction rotates down the latch release arm thereby releasing the fiber optic connector from an adapter port.

6. The field installable fiber optic connector according to claim 1, wherein the connector is configurable in a first polarity or a second polarity.

7. The field installable fiber optic connector according to claim 1, wherein the ferrule is a LC-Type optical ferrule or a mechanical transfer type ferrule.

8. The field installable fiber optic connector according to claim 1, wherein the latch controller comprises an inner housing and a tab controller.

9. A field installable fiber optic connector, comprising:
a ferrule with at least one optical fiber;
a pin-keeper, bias spring and backbody each with a longitudinal opening are secured about the optical cable after the optical cable is spliced to a pigtail at a distal end of the ferrule;
a proximal end of the ferrule is inserted and secured within a connector housing; and
a latch controller is secured to a distal end of the housing forming the field installable fiber optic connector.

10. The field installable fiber optic connector to claim 9, wherein a push/pull arm is secured to a distal end of the latch controller and is configured to longitudinally displace the latch controller.

11. The field installable fiber optic connector according to claim 9, wherein a push/pull cable boot is secured to a distal end of latch controller and is configured to longitudinally displace the latch controller.

12. A fiber optic connector configurable in a first polarity or a second polarity, comprising:
a connector housing with a top side and a bottom side,
the top side and the bottom side further comprise an adapter latch receiver;
a latch controller with a latch release arm nearer a proximal end of the latch controller,
the latch release arm is configured to be received in the adapter latch receiver; and wherein
the connector is in the first polarity when the latch release arm is within the latch receiver formed at the top side and further wherein the connector is in the second polarity when the latch release arm is within the latch receiver of the bottom side.

13. The fiber optic connector configurable in a first polarity or a second polarity according to claim 12, wherein a user can eject the latch controller from the connector housing by depressing opposing latch controller latches.

14. The fiber optic connector configurable in a first polarity or a second polarity according to claim 13, wherein the latch controller is rotated about a fiber optic cable when converting the fiber optic connector from the first polarity to a second polarity.

15. An interconvertible fiber optic connector, comprising:
a connector housing configured to receive a latch controller at a distal end of the connector housing;
the latch controller receives a releasably removable push/pull latch arm with opposing latches at a distal end of the latch controller or a cable boot operatively connected to the distal end of the latch controller; and wherein
the fiber optic connector is release from an adapter port when the user pulls rearward on the push/pull latch arm or the cable boot.

16. The interconvertible fiber optic connector according to claim 15, wherein the push/pull arm is removed and the fiber optic connector is released from an adapter port when the user pulls rearward on the cable boot.

17. The interconvertible fiber optic connector according to claim 15, wherein an underside protrusion formed as part of the push/pull release arm is received in an opening formed in the cable boot.

18. The interconvertible fiber optic connector according to claim 15, wherein the opposing latches are secured behind a leading edge of a top frame of an opening formed on one side of the latch controller, and further wherein pulling the push/pull arm rearward the latches engage the top frame thereby rotating down the latch release arm to release the interconvertible fiber optic connector from an adapter port.

19. The interconvertible fiber optic connector according to claim 15, wherein the latch controller is formed from a tab controller and an inner housing.

20. The interconvertible fiber optic connector according to claim 19, wherein the inner housing further comprises the latch arm release at nearer a proximal end of the inner housing, and further wherein rotating down the latch arm release releases the interconvertible fiber optic connector from an adapter port.

* * * * *